March 29, 1949. C. V. GANOE ET AL 2,465,585
PROSTHETIC KNEE JOINT
Filed Nov. 17, 1947

INVENTORS
Carrie M. Ganoe
BY Charles V. Ganoe
ATTORNEY

Patented Mar. 29, 1949

2,465,585

UNITED STATES PATENT OFFICE 2,465,585

PROSTHETIC KNEE JOINT

Charles V. Ganoe and Carrie M. Ganoe,
El Monte, Calif.

Application November 17, 1947, Serial No. 786,423

11 Claims. (Cl. 3—2)

This invention relates generally to prosthetic appliances, and more particularly to an improved prosthetic knee joint capable of being very simply locked into any selected angular position within the normal range of angular movement of a knee joint.

It should be noted that most prior art prosthetic joints have had numerous disadvantages. For example, many such joints are incapable of being locked in a selected position or unlocked when carrying load, which is undesirable in many circumstances. The reason for this is that many such prior art constructions have employed cam, gear, or ratchet arrangements having a plurality of teeth adapted to be engaged in a plurality of definite, fixed positions only, and when so engaged and load applied to the joint, the friction between the engaged portions prevents disengagement of such joint until the load is removed from the joint. Furthermore, as can be seen from the above description of the general structure of such prior art joints, only a limited number of relative angular positions of the two portions of the angular joint can be assumed, which correspond to the number of engaging positions of the ratchet, gear and cam arrangement forming the joint. In addition, the locking engagement of such prior art joints is often faulty and slippage may occur with dire consequences.

A particularly important feature in a knee joint is protection and safety for an amputee wearing such a knee joint. One of the major hazards of such use of a prosthetic knee joint is that the amputee may become slightly off balance and bend the prosthetic knee slightly while considerable load is imposed thereon. If this occurs, the prosthetic knee joint may bend very rapidly and the amputee fall to the floor, which may result in serious injury. It is highly desirable, therefore, that a prosthetic knee joint capable of being very rapidly and simply locked by the amputee in the above-described circumstances be provided, so that the prosthetic knee joint may assume load and prevent the amputee from falling to the ground.

Furthermore, it is highly desirable that a knee joint be provided capable of being locked in any selected angular position within the normal operating range of angular movement of a human knee joint, rather than being capable of taking only a certain number of angular knee positions such as is provided for in prior art devices. It is also highly desirable to provide a prosthetic knee joint of a positive locking nature not prone to become disengaged or slip in the manner of prior art structures.

Generally speaking, the apparatus of the present invention comprises an upper leg knee joint member and a lower leg knee joint member pivotally attached together for limited pivotal movement in the normal range of pivotal movement of a human knee joint. Pump means is effectively, operatively connected to said knee joint members whereby relative, pivotal or angular movement therebetween will actuate said pump means in a corresponding direction. Hydraulic by-pass means is effectively connected between opposite ends of said pump means and includes control valve means therein adapted to control the flow of hydraulic fluid from the pump means, whereby relative pivotal or angular movement of said knee joint members actuates the pump means in a corresponding direction, pumping hydraulic fluid through said by-pass means when said valve is open and whereby said relative, pivotal or angular movement between the knee joint members will be prevented when said valve means is closed. In the preferred form of the invention, the valve means may be arranged to be opened or closed by relative axial rotation between one of the knee joint members of the prosthetic partial leg to which it is adapted to be attached.

It can be seen from the above general description that since relative angular movement or pivotal movement of the prosthetic upper leg and the prosthetic lower leg actuate pump means, pumping hydraulic fluid through a closed hydraulic system containing a control valve, closure of said valve will prevent said pump from moving and correspondingly will prevent any further relative pivotal movement of the prosthetic upper and lower leg portions. This arrangement makes it possible to lock the knee joint in any desired position without the possibility or danger of slipping or disengagement. Furthermore, the arrangement whereby the valve means may be opened or closed by merely slightly axially rotating one of the prosthetic leg portions with respect to the knee joint member attached thereto makes it possible to lock or unlock the knee joint very rapidly and simply and under any and all circumstances. For example, if an amputee wearing the device of the present invention started to fall, he could quickly twist his limb stump slightly, which would lock the prosthetic knee joint and the upper and lower leg portions connected thereto in a fixed position capable of carrying the full load of the amputee's body, thus preventing him from falling to the ground.

It should be further noted that this construction makes it possible to either lock or unlock the knee joint irrespective of whether said knee joint is carrying load or not.

It should also be noted that it is possible to control the rate of relative, pivotal or angular movement of the upper prosthetic leg and the lower prosthetic leg by partially opening or closing the valve means and allowing the hydraulic fluid to flow therethrough at a controlled, limited rate, it being understood that as soon as the desired relative angular position is reached the valve can then be closed, locking the knee joint in such position.

With the above points in mind, it is an object of this invention to provide a new and improved prosthetic knee joint capable of being very simply and readily locked in any selected angular position within the normal operating range of a human knee joint.

It is a further object of this invention to provide a new and improved prosthetic knee joint capable of being locked or unlocked irrespective of whether or not load is imposed on said knee joint.

It is a further object of this invention to provide a new and improved prosthetic knee joint which may be locked or unlocked in any angular position within the normal operating range of a human knee joint by an amputee wearing same by merely slightly rotating his limb stump.

Another object of the present invention is to provide a new and improved prosthetic knee joint capable of angularly moving from one selected angular position to a second selected angular position at a controllable, angular velocity when under load and capable of being locked in said selected angular position upon reaching same.

Other and allied objects will occur to those skilled in the art upon a careful examination, study and perusal of the illustrations, specification, and appended claims. To facilitate understanding, reference will be had to the following drawings, in which:

Figure 2:
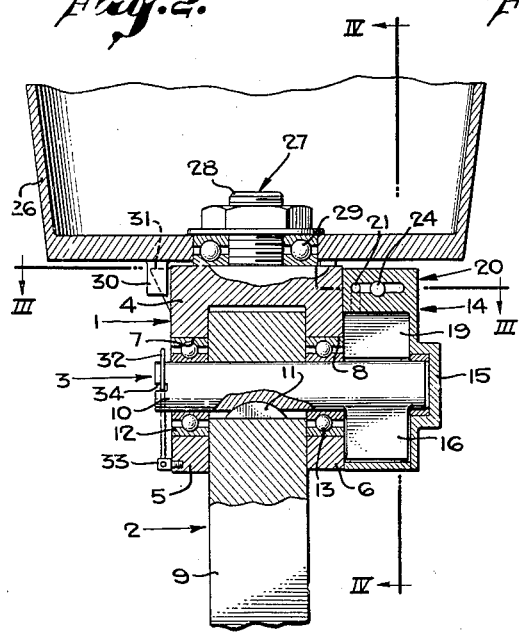
Fig. 2 is a vertical view in section taken along II—II of Fig. 1.
Figure 1:
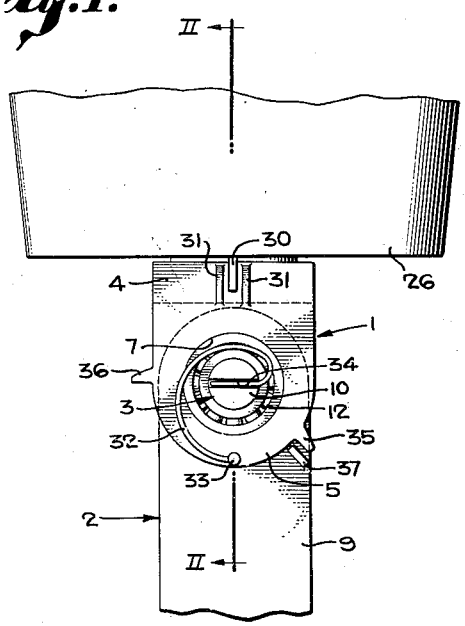
Fig. 1 is a diagrammatic side elevational view of one embodiment of this invention.

More specifically, referring to Figs. 1 and 2, a prosthetic upper knee joint member, indicated generally at 1 which is adapted to be carried by a prosthetic upper leg 26, and a prosthetic lower knee joint member, indicated generally at 2 which is adapted to be carried by a prosthetic lower leg shaft indicated at 9, are pivotally joined together, as indicated generally at 3, for limited, relative, pivotal or angular movement about the pivot point 3 within the normal range of angular movement of the human knee joint. In the example illustrated, the upper knee joint member 1 comprises a yoke 4 having two, parallel, downwardly extending ears 5 and 6 which are laterally, alignedly ported as indicated at 7 and 8. The lower knee joint member, indicated at 2 in the example illustrated, comprises a lower leg shaft 9 and a knee joint shaft 10 which is keyed to and rotatively fixed with respect to the lower leg shaft 9 by means of key indicated at 11. The knee joint shaft 10 is rotatably carried by the ports 7 and 8 in the ears 5 and 6 and in the example shown, rotatable radial bearings 12 and 13 are positioned between the knee joint shaft 3 and the ports 7 and 8 in the ears 5 and 6 for reducing friction. Various other types of antifriction means may be utilized, if desired, or these may be dispensed with entirely, under certain circumstances.

Pump means, indicated generally at 14, is effectively, operatively connected to or between the upper knee joint member 1 and the lower knee joint member 2 whereby relative, pivotal or angular movement between said knee joint members will actuate said pump in a corresponding direction. In the example shown, the pump means 14 comprises a cylindrical housing 15 carried by the ear 6 of the yoke 4, which is open at the left-hand side thereof as viewed in Fig. 2, and axially receives the end of the knee joint shaft 10 therein and a radial rotor vane 16 carried by said knee joint shaft 10.

Figure 4:
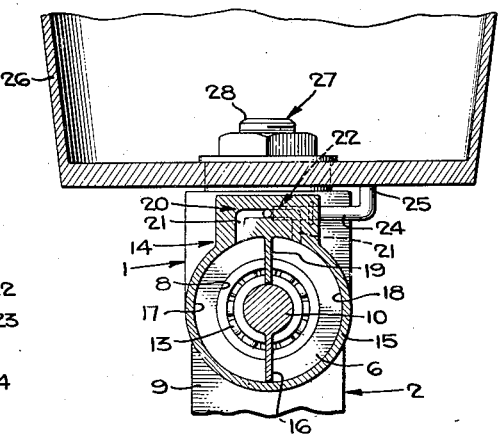
Fig. 4 is a vertical view in section taken along IV—IV of Fig. 2.

The cylindrical housing 15 is divided into two variable volume chambers indicated at 17 and 18 in Fig. 4 by reason of the radial rotor vane 16 carried by the knee joint shaft 10 and by reason of the fixed radial stator vane 19 extending radially inwardly from the interior of the housing 15 virtually into contact with the knee shaft 10. It should be noted that the volume of the variable volume chambers 17 and 18 may be changed by relatively rotating the knee shaft 10 with respect to the housing 15, thus relatively rotating the rotor vane 16 with respect to the fixed stator vane 19 and reducing the volume of one of said chambers while correspondingly increasing the volume of the other of said chambers. It should be noted that said chambers are adapted to contain suitable hydraulic fluid therein.

By-pass means, indicated generally at 20, is provided for effectively connecting opposite sides of the pump means 14. In the example shown, this comprises a conduit 21 connecting the two chambers 17 and 18. Controllable valve means, indicated at 22, is provided for effectively opening or closing the by-pass means 20, thus allowing or preventing the flow of hydraulic fluid between opposite chambers 17 and 18 of the pump 14.

Figure 3:
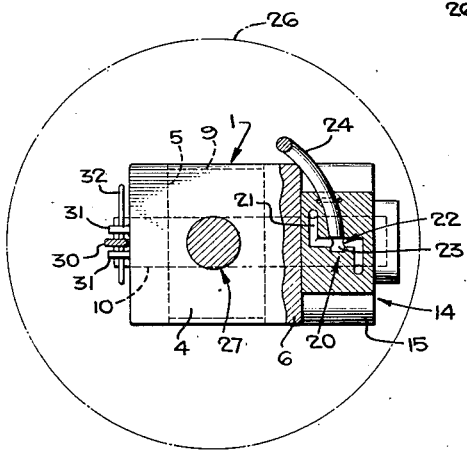
Fig. 3 is a horizontal view in section taken along III—III of Fig. 2.

In the example shown, the by-pass means between the two chambers 17 and 18 take a zig-zag form, as best shown in Fig. 3, and is provided with an aperture laterally passing through the conduit 21 and indicated at 23 which, in the example shown, continues on through the housing in a curved arcuate path and is adapted to receive therein a similarly curved rod 24 of a similar cross section which is adapted to be attached at its opposite ends, as indicate at 25, to the lower end of an upper prosthetic leg portion 26. This arrangement makes it possible to insert the curved rod 24 into the similar curved aperture 23 and to close the conduit 21 between the chambers 17 and 18, thus effectively closing opposite sides of the pump and prevent the passage of hydraulic fluid from one side thereof to the other side thereof. The rod 24 may be moved slightly outwardly in the aperture 23, thus opening the conduit 21 and permitting the passage of fluid between the chambers 17 and 18.

This opening and closing movement of the valve 22 is accomplished by slightly rotating the prosthetic upper leg portion, indicated at 26, with respect to the yoke 4. This may be accomplished when the foot of the lower prosthetic leg portion, not shown, which is adapted to be attached to the lower prosthetic leg shaft 9 is resting upon the ground and the limb stump of the amputee which is adapted to be fixed with respect to the upper prosthetic leg portion 26 is axially rotated with respect thereto, thus either opening or closing the valve 22, depending upon the direction of said rotation.

It should be noted that the yoke 4 is attached to the lower end of the upper prosthetic leg portion 26 for such limited relative axial rotation at 27, thus allowing said valve actuating relative rotation. The rotatable connection between the yoke 4 and the lower end of the prosthetic leg 26, as indicated at 27, comprises a bolt and nut 28, a thrust bearing 29, and a downwardly extending projection 30 carried by the lower end of the prosthetic leg portion 26 and positioned between spaced stops 31 carried by the yoke 4 which act to limit the relative axial rotation between the yoke 4 and the lower end of the prosthetic leg portion 26 to a very small angular rotation just sufficient to open or close the control valve means 22.

Spring means 32 is provided for normally biasing the knee joint to a fully extended position. In the example shown this arrangement comprises the spring 32, one end of which is fixed by screw means 33 to the lower end of the ear 5 of the yoke 4 and the other end of which is bent and inserted and retained in a slot 34 in the end of the knee shaft 10, thus tending to bias the knee joint in a position corresponding to an extended leg. Said biasing means is prevented from causing the knee joint to bend forwardly in a manner dissimilar to a human knee joint by providing stop means for limiting the relative angular movement between the prosthetic upper leg and the prosthetic lower leg. In the example shown, this stop means comprises the projections 35 and 36 carried by the ear 5 of the yoke 4 and the projection 37 carried by the lower leg shaft 9 adapted to abut the projection 35 when the knee joint is in a position corresponding to a fully extended leg and adapted to abut the projection 36 when the knee joint is in fully flexed position.

Numerous modifications and variations of the present invention within the spirit and scope hereof will occur to those skilled in the art and all such are intended to be included and comprehended herein. For example, the pump means 14 may assume various forms and may be connected in either direction between, and may be affixed to either of the knee joint members. The by-pass means and the control valve means may be modified in any desired manner. The structure of the yoke, knee shaft, and lower leg shaft may be modified within wide limits. The stop means for limiting relative rotation about the longitudinal axis of the leg and relative pivotal or angular movement about the lateral axis of the knee may be varied within wide limits. The spring means for normally biasing the joint into an extended position may be modified or dispensed with, if desired. The control valve means and the arrangement for actuating same may be modified within wide limits and need not necessarily be attached to the upper leg portion but may be attached to the lower leg portion, if desired.

The examples described and illustrated herein are exemplary only and are not intended to limit the scope of this invention, which is to be interpreted in the light of the prior art and appended claims only.

We claim:

1. A prosthetic knee joint, the upper end of which is arranged to be effectively fastened to a prosthetic upper leg and the lower end of which is arranged to be effectively fastened to a prosthetic lower leg and which is adapted to be selectively locked in any desired relative, angular position within the normal range of angular movement of a human knee joint, comprising: a downwardly extending yoke member arranged for attachment to the lower end of a prosthetic upper leg for limited relative rotation about the longitudinal axis of the leg, said yoke member including two parallel, downwardly extending, laterally alignedly ported ears; a knee shaft rotatably, laterally mounted within said laterally alignedly ported ears and arranged for attachment to a prosthetic lower leg; pump means effectively, operably connected between said yoke and said knee shaft including a cylindrical, closed housing carried by the yoke and axially rotatably receiving the knee shaft; a radial rotor vane carried by said knee shaft rotatably positioned within said housing, the interior of said housing being divided into two variable volume chambers by a fixed radial stator vane extending radially from the interior of the housing virtually into contact with the knee shaft passing through the center thereof and by the radial rotor vane carried by the knee shaft; by-pass means effectively, hydraulically connecting said two chambers; controllable valve means in said by-pass means for controlling flow of hydraulic fluid between said chambers, said pump means, by-pass means and said valve means, constituting hydraulic brake means arranged for operable effective connection between a prosthetic upper leg and a prosthetic lower leg, whereby when said valve means is open, relative torque between the yoke and knee shaft will rotate said rotor vane in a corresponding direction and increase the volume of one of said chambers and decrease the volume of the other of said chambers, and whereby said rotor rotation will be prevented when said valve means is closed, said valve means being arranged to be opened or closed by said relative limited axial rotation between the yoke and the prosthetic upper leg to which it is arranged to be attached; and spring means normally biasing the knee shaft and yoke into a position corresponding to a fully extended knee joint.

2. A prosthetic knee joint, the upper end of which is arranged to be effectively fastened to a prosthetic upper leg and the lower end of which is arranged to be effectively fastened to a prosthetic lower leg and which is adapted to be selectively locked in any desired relative, angular position within the normal range of angular movement of a human knee joint, comprising: a downwardly extending yoke member arranged for attachment to the lower end of a prosthetic upper leg for limited relative rotation about the longitudinal axis of the leg, said yoke member including two parallel, downwardly extending, laterally alignedly ported ears; a knee shaft rotatably, laterally mounted within said laterally alignedly ported ears and arranged for attachment to a prosthetic lower leg; pump means effectively, operably connected between said yoke and said knee shaft including a cylindrical, closed housing carried by the yoke and axially rotatably receiving the knee shaft; a radial rotor vane carried by said knee shaft rotatably positioned within said housing, the interior of said housing being divided into two variable volume chambers by a fixed radial stator vane extending radially from the interior of the housing virtually into contact with the knee shaft passing through the center thereof and by the radial rotor vane carried by the knee shaft; by-pass means effectively, hydraulically connecting said two chambers; controllable valve means in said by-pass means for controlling flow of hydraulic fluid between said chambers, said pump means, by-pass means and said valve means, constituting hydraulic brake means arranged for operable effective connection between a prosthetic upper leg and a prosthetic lower leg, whereby when said valve means is open, relative torque between the yoke and knee shaft will rotate said rotor vane in a corresponding direction and increase the volume of one of said chambers and decrease the volume of the other of said chambers, and whereby said rotor rotation will be prevented when said valve means is closed, said valve means being arranged to be opened or closed by said relative limited axial rotation between the yoke and the prosthetic upper leg to which it is arranged to be attached.

3. A prosthetic knee joint, the upper end of which is arranged to be effectively fastened to a prosthetic upper leg and the lower end of which is arranged to be effectively fastened to a prosthetic lower leg and which is adapted to be selectively locked in any desired relative, angular position within the normal range of angular movement of a human knee joint, comprising: a downwardly extending yoke member arranged for attachment to the lower end of a prosthetic upper leg, said yoke member including two parallel, downwardly extending, laterally alignedly ported ears; a knee shaft rotatably, laterally mounted within said laterally alignedly ported ears and arranged for attachment to a prosthetic lower leg; pump means effectively, operably connected between said yoke and said knee shaft including a cylindrical, closed housing carried by the yoke and axially, rotatably receiving the knee shaft; a radial rotor vane carried by said knee shaft rotatably positioned within said housing, the interior of said housing being divided into two variable volume chambers by a fixed radial stator vane extending radially from the interior of the housing virtually into contact with the knee shaft passing through the center thereof and by the radial rotor vane carried by the knee shaft; by-pass means effectively hydraulically connecting said two chambers; controllable valve means in said by-pass means for controlling flow of hydraulic fluid between said chambers, said pump means, by-pass means and said valve means, constituting hydraulic brake means arranged for operable effective connection between a prosthetic upper leg and a prosthetic lower leg, whereby when said valve means is open, relative torque between the yoke and knee shaft will rotate said rotor vane in a corresponding direction and increase the volume of one of said chambers and decrease the volume of the other of said chambers and whereby said rotor rotation will be prevented when said valve means is closed.

4. A pivotally connected prosthetic knee joint, the upper end thereof being arranged to be effectively fastened to a prosthetic upper leg and the lower end thereof being arranged to be effectively fastened to a prosthetic lower leg and adapted to be selectively locked in any desired relative, angular position within the normal range of angular movement of a knee joint, comprising: a downwardly extending yoke member arranged for attachment to the lower end of a prosthetic upper leg for limited relative rotation about the longitudinal axis of the leg, said yoke member including parallel, downwardly extending, laterally alignedly ported ears; knee shaft means rotatably, laterally mounted within said laterally alignedly ported ears and arranged for attachment to a prosthetic lower leg; hydraulic pump means operably effectively connected between said yoke and said knee shaft and arranged to be actuated by relative, pivotal movement therebetween; by-pass means effectively, hydraulically connecting opposite sides of said pump means; controllable valve means in said by-pass means for controlling the flow of hydraulic fluid between the opposite sides of said pump means, whereby when said valve means is open relative torque between said knee shaft and said yoke will cause said relative, pivotal movement therebetween and will actuate said pump means in a corresponding direction and whereby said relative, pivotal movement between the knee shaft and yoke will be prevented when said valve means is closed, said valve being arranged to be opened or closed by said limited relative axial rotation between the yoke and a prosthetic upper leg to which it is adapted to be attached; and spring means normally biasing the knee shaft and yoke into a position corresponding to a fully extended knee joint.

5. A pivotally connected prosthetic knee joint, the upper end thereof being arranged to be effectively fastened to a prosthetic upper leg and the lower end thereof being arranged to be effectively fastened to a prosthetic lower leg and adapted to be selectively locked in any desired relative, angular position within the normal range of angular movement of a knee joint, comprising: a downwardly extending yoke member arranged for attachment to the lower end of a prosthetic upper leg for limited relative rotation about the longitudinal axis of the leg, said yoke member including parallel, downwardly extending, laterally alignedly ported ears; knee shaft means rotatably, laterally mounted within said laterally alignedly ported ears and arranged for attachment to a prosthetic lower leg; hydraulic pump means operably, effectively connected between said yoke and said knee shaft and arranged to be actuated by relative, pivotal movement therebetween; by-pass means effectively, hydraulically connecting opposite sides of said pump means; and controllable valve means in said by-pass means for controlling the flow of hydraulic fluid between the opposite sides of said pump means, whereby when said valve means is open relative torque between said knee shaft and said yoke will cause said relative, pivotal movement therebetween and will actuate said pump means in a corresponding direction and whereby said relative, pivotal movement between the knee shaft and yoke will be prevented when said valve means is closed, said valve being arranged to be opened or closed by said limited relative axial rotation between the yoke and a prosthetic upper leg to which it is adapted to be attached.

6. A pivotally connected prosthetic knee joint, the upper end thereof being arranged to be effectively fastened to a prosthetic upper leg and the lower end thereof being arranged to be effectively fastened to a prosthetic lower leg and adapted to be selectively locked in any desired relative, angular position within the normal range of angular movement of a knee joint, comprising: a downwardly extending yoke member arranged for attachment to the lower end of a prosthetic upper leg, said yoke member including parallel, downwardly extending, laterally alignedly ported ears; knee shaft means rotatably, laterally mounted within said laterally alignedly ported ears and arranged for attachment to a prosthetic lower leg; hydraulic pump means operably, effectively connected between said yoke and said knee shaft and arranged to be actuated by relative, pivotal movement therebetween; by-pass means effectively, hydraulically connecting opposite sides of said pump means; and controllable valve means in said by-pass means for controlling the flow of hydraulic fluid between the opposite sides of said pump means, whereby when said valve means is open relative torque between said knee shaft and said yoke will cause said relative, pivotal movement therebetween and will actuate said pump means in a corresponding direction and whereby said relative, pivotal movement between the knee shaft and yoke will be prevented when said valve means is closed.

7. A prosthetic knee joint arranged to effectively, pivotally fasten a prosthetic upper leg and a prosthetic lower leg together and to selectively lock same in any desired relative angular position within the normal range of movement of a knee joint, comprising: an upper leg knee joint member and a lower leg knee joint member pivotally attached together for a limited range of relative pivotal movement about a lateral axis, one of said knee joint members being arranged for attachment to the end of a prosthetic partial leg for limited relative rotation about the longitudinal axis of the leg; pump means arranged to contain hydraulic fluid and be effectively, operatively connected to said knee joint members, whereby relative, pivotal movement of said knee joint members will actuate said pump in a corresponding direction; by-pass means effectively, hydraulically connecting opposite sides of said pump means; controllable valve means in said by-pass means for controlling flow of hydraulic fluid between the opposite sides of said pump means, whereby when said valve means is open relative torque between said knee joint members about said lateral axis will cause relative rotation therebetween and will actuate said pump means in a corresponding direction and whereby said relative, pivotal movement will be prevented when said valve means is closed, said valve means being arranged to be opened or closed by said relative limited axial rotation between the knee joint member and the prosthetic partial leg to which it is arranged to be attached; and means normally biasing said knee joint into a fully extended position.

8. A prosthetic knee joint arranged to effectively, pivotally fasten a prosthetic upper leg and a prosthetic lower leg together and to selectively lock same in any desired relative angular position within the normal range of movement of a knee joint, comprising: an upper leg knee joint member and a lower leg knee joint member pivotally attached together for a limited range of relative pivotal movement about a lateral axis, one of said knee joint members being arranged for attachment to the end of a prosthetic partial leg for limited relative rotation about the longitudinal axis of the leg; pump means arranged to contain hydraulic fluid and be effectively, operatively connected to said knee joint members, whereby relative, pivotal movement of said knee joint members will actuate said pump in a corresponding direction; by-pass means effectively, hydraulically connecting opposite sides of said pump means; and controllable valve means in said by-pass means for controlling flow of hydraulic fluid between the opposite sides of said pump means, whereby when said valve means is open relative torque between said knee joint members about said lateral axis will cause relative rotation therebetween and will actuate said pump means in a corresponding direction and whereby said relative, pivotal movement will be prevented when said valve means is closed, said valve means being arranged to be opened or closed by said relative limited axial rotation between the knee joint member and the prosthetic partial leg to which it is arranged to be attached.

9. A prosthetic knee joint comprising: an upper knee joint member and a lower knee joint member connected to each other by means of a horizontal pivot shaft; a pump housing including a substantially cylindrical hydraulic pump chamber fixedly connected to one of said members, said pump chamber being concentric with and surrounding the end of the pivot shaft; a radial vane carried by the end of the pivot shaft within said pump chamber, said shaft being connected to the other of said joint members; a stationary radial partition in said chamber, said partition and vane dividing the pump chamber into two variable volume chambers; a by-pass conduit connecting said variable volume chambers; and a valve means in said conduit for selectively opening and closing the conduit.

10. In a prosthetic knee joint of the character stated in claim 9, the provision of a socket for the reception of the upper leg, a connection between the socket and the upper knee joint member including a vertical pivot pin and a thrust bearing, and means actuated by partial rotation of the socket with respect to the upper knee joint member for opening and closing said valve means.

11. A prosthetic knee joint of the character stated in claim 9 including cooperating stop means carried by said joint members for limiting pivotal movement of the lower knee joint member with respect to the upper joint member, and spring means biasing said pivotally connected joint members against one of said stop means.

CHARLES V. GANOE.
CARRIE M. GANOE.

REFERENCES CITED

The following references are of record in the file of this patent:

UNITED STATES PATENTS

| Number | Name | Date |
| --- | --- | --- |
| 2,305,291 | Filippi | Dec. 15, 1942 |